(12) United States Patent  
Yamanaka et al.

(10) Patent No.: US 8,921,723 B2  
(45) Date of Patent: Dec. 30, 2014

(54) SLIDE SWITCH

(71) Applicant: Hosiden Corporation, Osaka (JP)

(72) Inventors: Satoshi Yamanaka, Osaka (JP); Kenjiro Desaki, Osaka (JP); Hirofumi Koizumi, Osaka (JP)

(73) Assignee: Hosiden Corporation, Osaka (JP)

( * ) Notice: Subject to any disclaimer, the term of this patent is extended or adjusted under 35 U.S.C. 154(b) by 138 days.

(21) Appl. No.: 13/736,862

(22) Filed: Jan. 8, 2013

(65) Prior Publication Data

US 2013/0175146 A1 Jul. 11, 2013

(30) Foreign Application Priority Data

Jan. 11, 2012 (JP) ................................ 2012-002784

(51) Int. Cl.

| | |
|---|---|
| *H01H 3/16* | (2006.01) |
| *H01H 15/04* | (2006.01) |
| *B60R 22/48* | (2006.01) |
| *H01H 15/14* | (2006.01) |
| *H01H 1/36* | (2006.01) |
| *H01H 9/04* | (2006.01) |

(52) U.S. Cl.
CPC ............... *H01H 15/04* (2013.01); *B60R 22/48* (2013.01); *H01H 15/14* (2013.01); *H01H 1/365* (2013.01); *H01H 9/04* (2013.01); *B60R 2022/4816* (2013.01)
USPC ...................................................... 200/61.59

(58) Field of Classification Search
USPC ....... 200/547, 61.58 B, 61.59, 537, 550, 549, 200/293–296, 303–307
See application file for complete search history.

(56) References Cited

U.S. PATENT DOCUMENTS

| 6,333,479 B1 * | 12/2001 | Tai ................................ 200/550 |
| 6,483,063 B2 * | 11/2002 | Chu ............................. 200/547 |
| 7,538,283 B2 * | 5/2009 | Muromachi ........... 200/61.58 B |
| 2011/0067209 A1 | 3/2011 | Yamanaka et al. |

FOREIGN PATENT DOCUMENTS

JP 2011-062423 3/2011

\* cited by examiner

*Primary Examiner* — Edwin A. Leon
(74) *Attorney, Agent, or Firm* — Greenblum & Bernstein, P.L.C.

(57) ABSTRACT

A slider is slidably held in a body and is pushed by insertion of an object to slidingly move. Terminals are provided with fixed contact points disposed on a surface, facing the slider, of the body along a sliding movement direction. The armature is attached to the slider and is provided with moving contact points that slide on a fixed contact point disposition surface of the body in association with sliding movement of the slider. The slider has an armature mounting surface with a side wall protrudingly formed in one end in the sliding movement direction. The body has a facing surface facing an end surface of the side wall in an entire range of sliding movement. At least any one of an end in the sliding movement direction of the end surface of the side wall and an end in the sliding movement direction of the facing surfaces of the body has a foreign substance elimination groove formed therein.

7 Claims, 15 Drawing Sheets

SLIDE SWITCH

TECHNICAL FIELD

The present invention relates to a slide switch that senses an extracted state and an inserted and engaged state of an object.

BACKGROUND ART

Japanese Patent Application Laid Open No. 2011-62423 (hereinafter, referred to as Patent Literature 1) is understood as a conventional technique of a slide switch. FIG. 16 is an exploded perspective view illustrating a configuration of a slide switch 9 according to Patent Literature 1. The slide switch 9 is provided with a body 920, a slider 930 that is held slidingly movably in the body 920 and is pushed by a moving part on a buckle device side to slidingly move, fixed contact points 941 through 943 that are disposed on a surface, facing the slider 930, of the body 920 along a sliding movement direction, and a movable armature 944 that is attached to the slider 930 and slides on a fixed contact point disposition surface of the body 920 in association with sliding movement of the slider 930. The body 920 has a tip end with a stopper 923 protrudingly formed on a lower surface side thereof. The slider 930 has a lower surface with a pair of projections 932 located both ends in the width direction and protrudingly formed downward. The slider 930 is sized to cover up the fixed contact points 941 through 943 in the entire range of its sliding movement. A spring 945 biases the slider 930 in an extraction direction of a tongue.

FIGS. 17A and 17B show relationship between a moving part 51 equipped on the buckle device side, into which this slide switch 9 is incorporated, and the slide switch 9, and the moving part 51 is shown in simplification. The slider 930 is biased by a spring 945 and, in its initial position, has a tip end surface thereof in a state of being butted against the stopper 923 protrudingly formed on the tip end lower surface of the body 920 (refer to FIG. 17A). The moving part 51 slidingly moves by inserting a tongue on a seat belt side into the buckle device, abuts on the projections 932 at the tip end of the slider 930, and pushes the slider 930 to slidingly move the slider 930 (refer to FIG. 17B).

With such a configuration, the fixed contact points are always covered up by the slider, so that they are not easily affected by a foreign substance and the like, and thus it is possible to prevent adhesion of a foreign substance, such as dust. Further, in a case of applying grease on the fixed contact points, it is possible to prevent adhesion of a foreign substance to the grease and transfer and adhesion of the grease to an unintended area or component.

SUMMARY OF THE INVENTION

Between the body 920 and the slider 930, a gap (clearance) is required in order to interpose the movable armature 944 and to allow the slider 930 to slide on the body 920. Since the moving contact points are exposed from the gap, there is a possibility that a foreign substance enters from the gap before and upon incorporating the slide switch 9 into the buckle device and further during the use of the buckle device, and any or both of the fixed contact points and the moving contact points are contaminated and affected by the foreign substance. For example, the gap between the body and the slider is made smaller as much as possible, thereby enabling to reduce entrance of a foreign substance from the gap. However, as the gap is made smaller, there is an increasing possibility that the slider bites a foreign substance adhered to a facing surface of the body during slide. Due to the biting of a foreign substance, an action failure occurs, such as (1) sliding movement is not allowed to a fundamentally required stroke (full stroke), (2) the slider is not allowed to slidingly move, and (3) the load to slidingly move the slider increases.

It is an object of the present invention to provide a slide switch that can reduce entrance and biting of a foreign substance and is excellent in reliability.

In order to solve the problems, according to a first aspect of the present invention, a slide switch senses an extracted state and an inserted and engaged state of an object. The slide switch includes a body, a slider, a terminal, and an armature. The slider is slidably held in the body and is pushed by insertion of the object to slidingly move. The terminal is provided with a fixed contact point disposed on a surface, facing the slider, of the body along a sliding movement direction. The armature is attached to the slider and is provided with a moving contact point that slides on a fixed contact point disposition surface of the body in association with sliding movement of the slider. The slider has an armature mounting surface in one end in the sliding movement direction with a first side wall protrudingly formed therein. The body has a first facing surface facing an end surface of the first side wall formed in an entire range of sliding movement. At least any one of an end in the sliding movement direction of the end surface of the first side wall and an end in the sliding movement direction of the first facing surface of the body has a first foreign substance elimination groove formed therein.

According to the present invention, such effects are exhibited that it is possible to reduce entrance of a foreign substance by the side wall formed in the slider, and it is possible to reduce biting of a foreign substance by equipping the foreign substance elimination groove.

DETAILED DESCRIPTION OF THE EMBODIMENTS

Figure 1A:
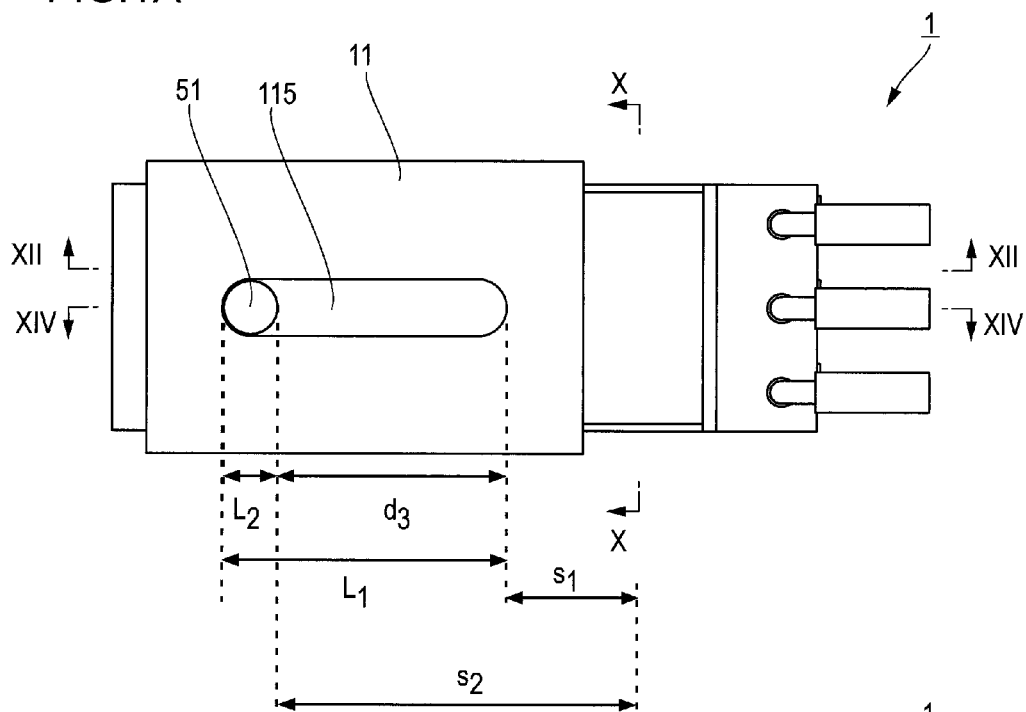
FIG. 1A is a front view of a slide switch according to a first embodiment in a case that a slider is located in an initial position.

Descriptions are given below to embodiments of the present invention. In the drawings used for the descriptions below, an identical reference character is given to component parts having a same function to omit repetitive descriptions.

First Embodiment

Figure 1B:
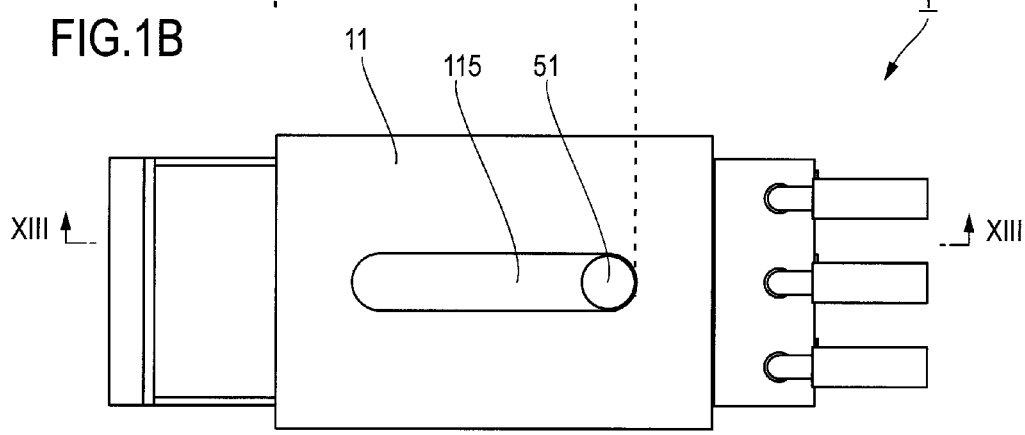
FIG. 1B is a front view of the slide switch according to the first embodiment in a case that the slider is located in a post-action position.
Figure 2:
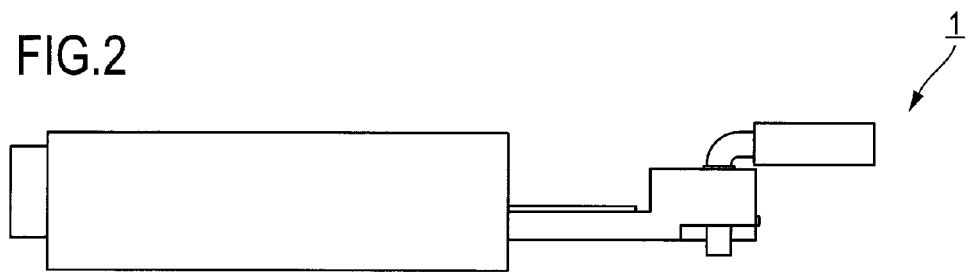
FIG. 2 is a bottom view of the slide switch according to the first embodiment.
Figure 3:
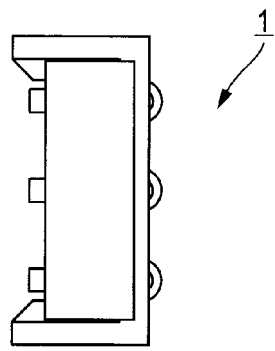
FIG. 3 is a left side view of the slide switch according to the first embodiment.
Figure 4:
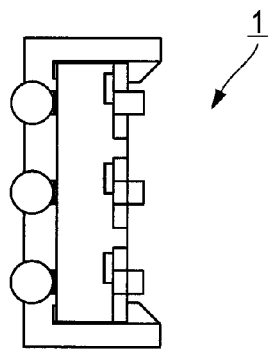
FIG. 4 is a right side view of the slide switch according to the first embodiment.
Figure 5:
FIG. 5 is a back view of the slide switch according to the first embodiment.
Figure 6:
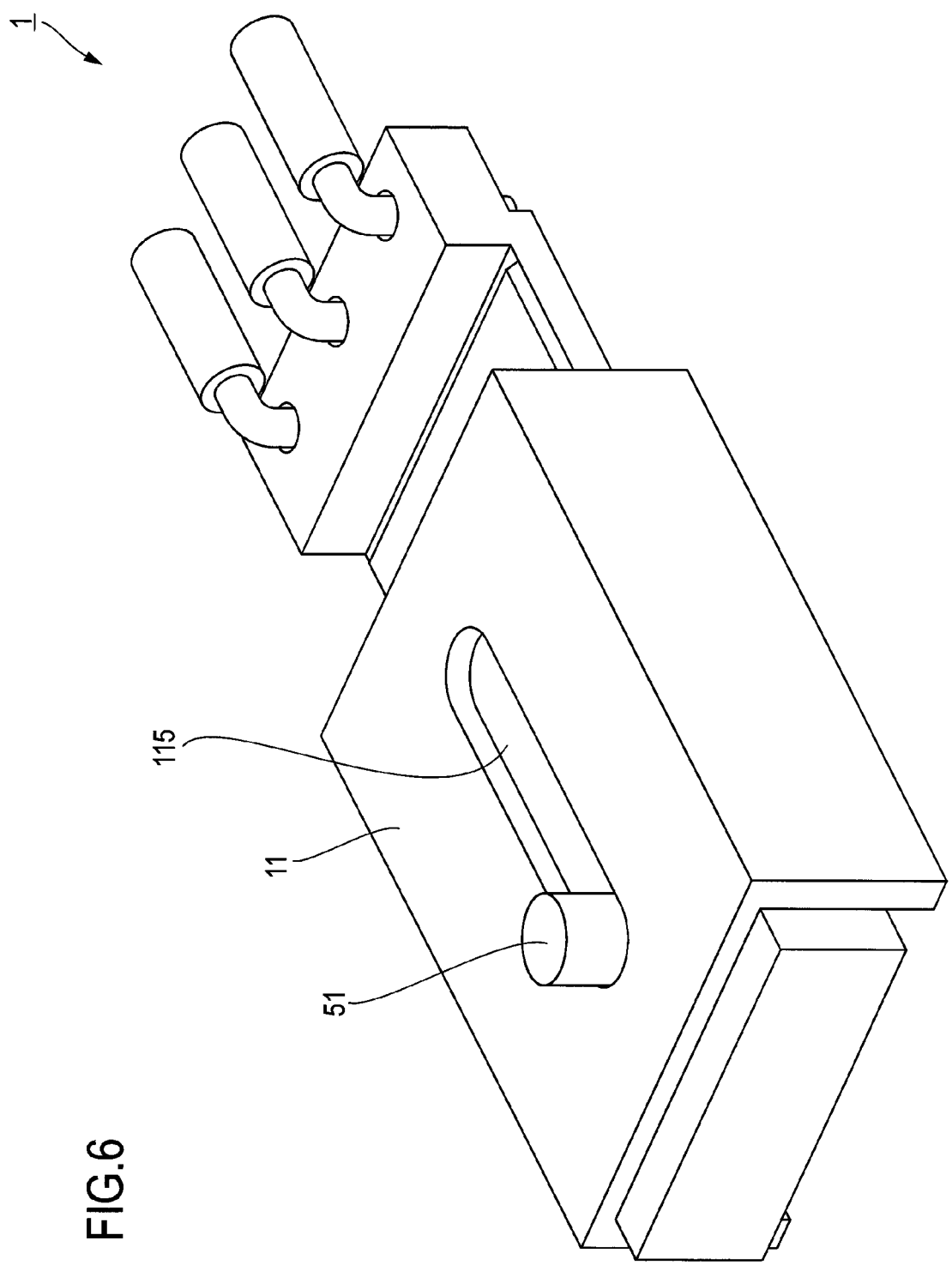
FIG. 6 is a perspective view of the slide switch according to the first embodiment viewed from the front.
Figure 7:
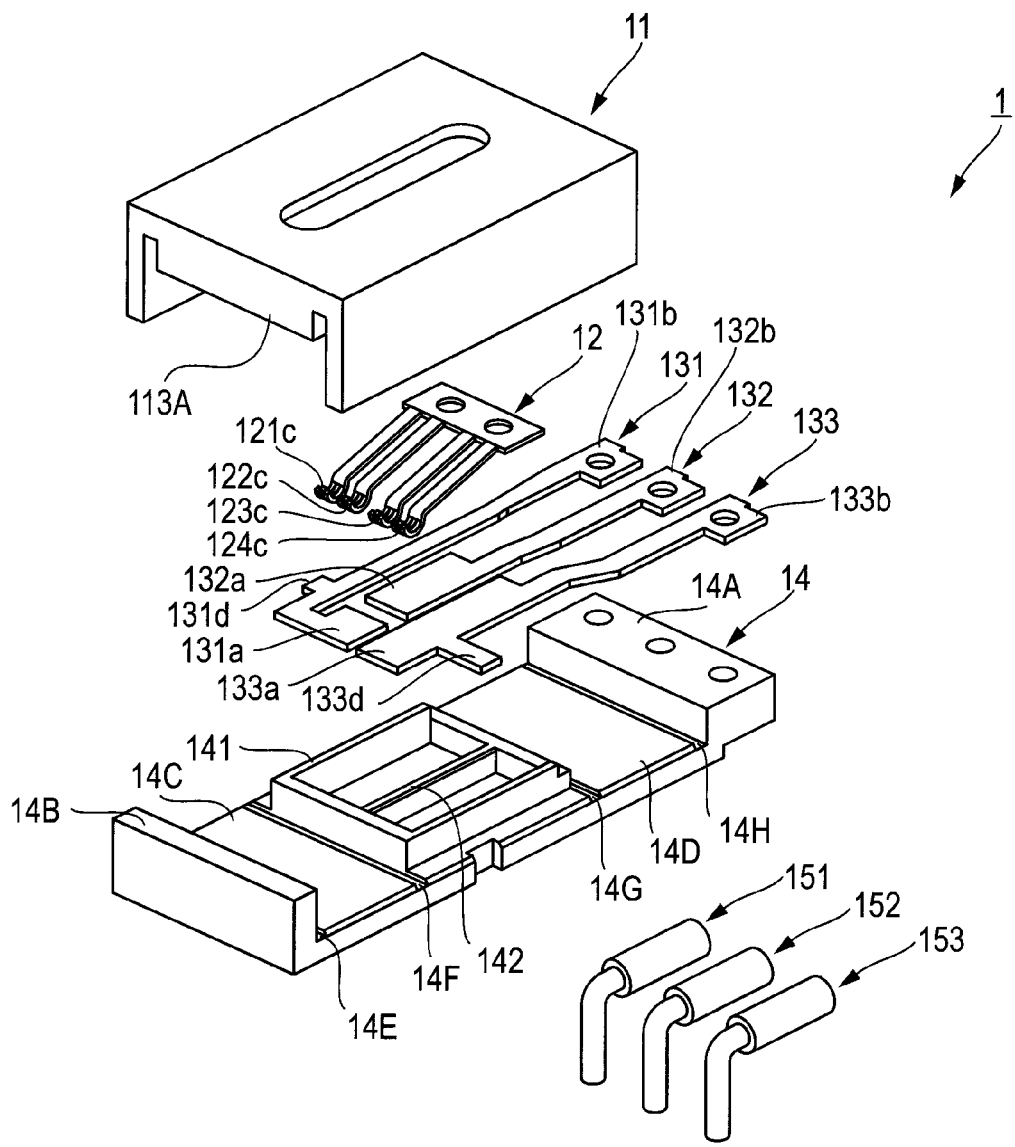
FIG. 7 is an exploded perspective view of the slide switch according to the first embodiment viewed from the front.
Figure 8:
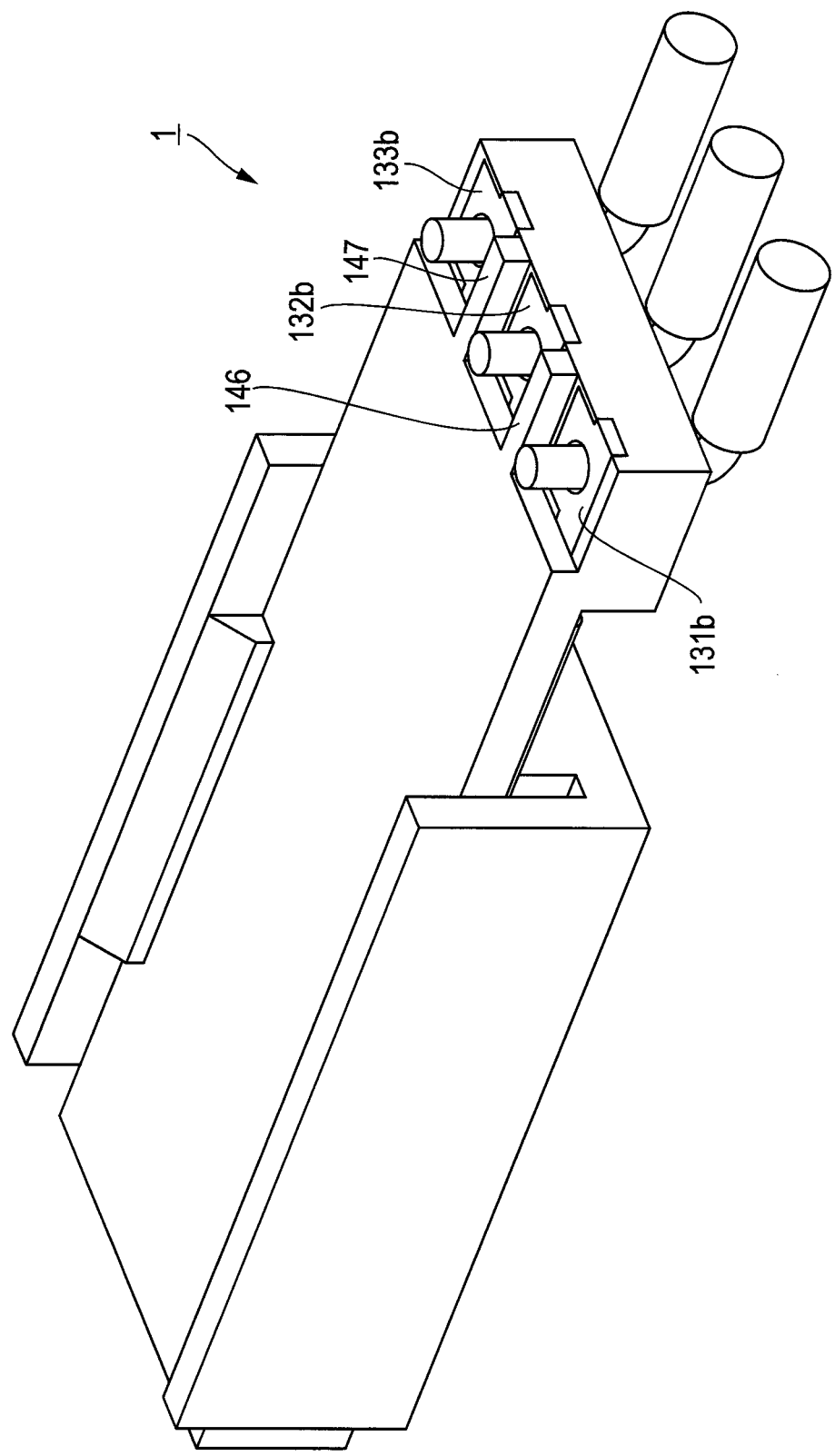
FIG. 8 is a perspective view of the slide switch according to the first embodiment viewed from the back.
Figure 9:
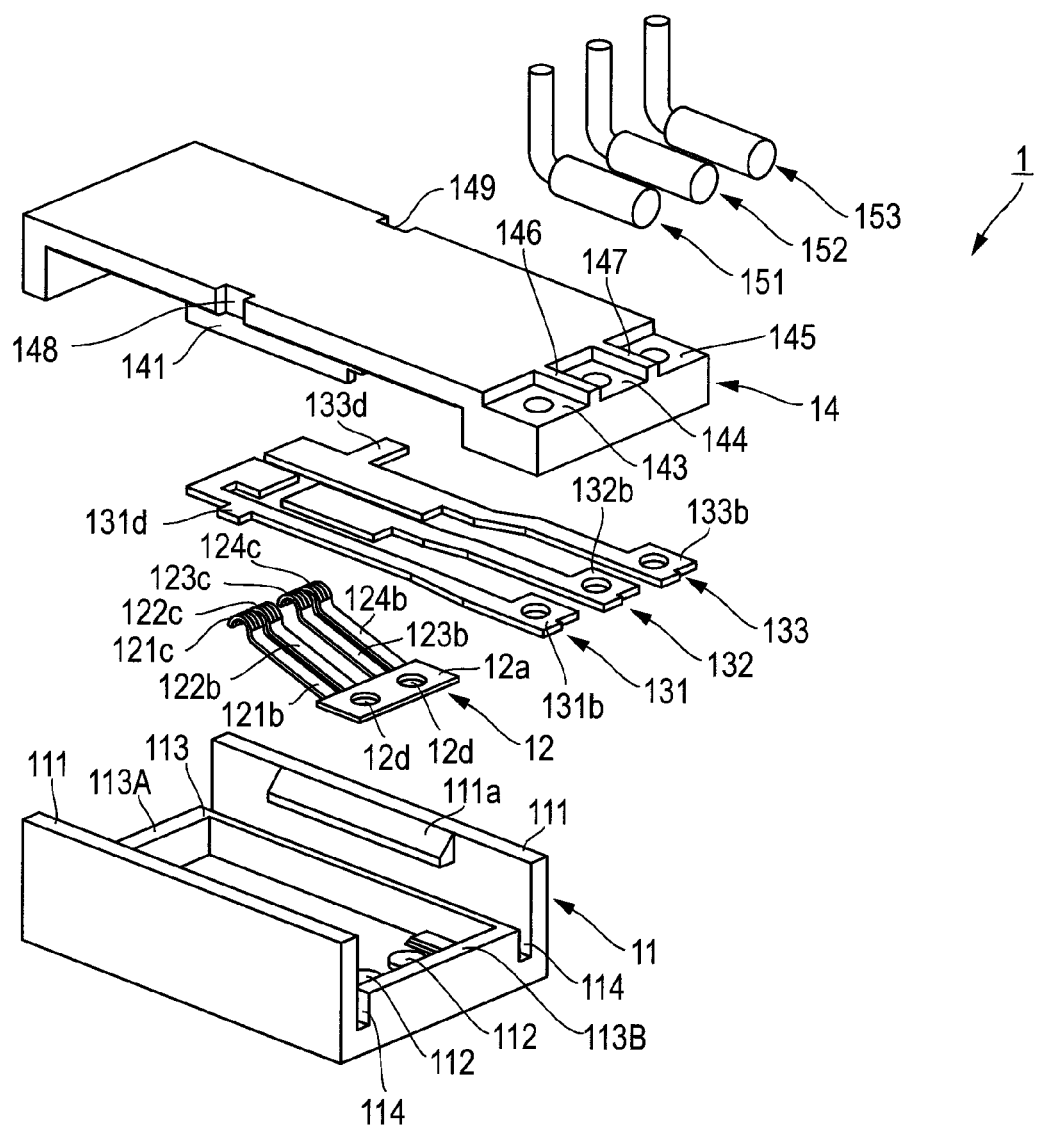
FIG. 9 is an exploded perspective view of the slide switch according to the first embodiment viewed from the back.

FIG. 1A illustrates a front view of a slide switch 1 according to a first embodiment in a case that a slider 11 is located in an initial position, and FIG. 1B illustrates a front view in a case that the slider 11 is located in a post-action position. FIG. 2 illustrates a bottom view of the slide switch 1 according to the first embodiment, FIG. 3 illustrates a left side view thereof, FIG. 4 illustrates a right side view thereof, and FIG. 5 illustrates a back view thereof. FIG. 6 illustrates a perspective view of the slide switch 1 viewed from the front, FIG. 7 illustrates an exploded perspective view thereof, FIG. 8 illustrates a perspective view of the slide switch 1 viewed from the back, and FIG. 9 illustrates an exploded perspective view thereof. In some of the drawings, three harnesses 151 through 153 are collectively illustrated, and in FIGS. 1A, 1B, and 6, the moving part 51 is illustrated collectively.

The slide switch 1 includes the slider 11, an armature 12, three terminals 131 through 133, and a body 14 (refer to FIGS. 7 and 9), and senses an extracted state and an inserted and engaged state of an object. In the present embodiment, the slide switch 1 is assumed to be incorporated into a buckle device having a tongue (tongue plate), attached to a seat belt, inserted therein for engagement and senses whether or not a crew has mounted the seat belt using the slide switch 1. In the present embodiment, it is assumed that the moving part 51 is equipped on the buckle device side and, in a case that the tongue is removed from the buckle device, it is assumed that a mechanism to return the moving part 51 to the initial position (a position in an extracted state of the tongue) exists on the buckle device side. Therefore, the moving part 51 is pushed in a post-action position (a position of the tongue in an inserted and engaged state) direction by inserting the tongue, and is pushed in an initial position direction by removing the tongue.

<Body 14 and Terminals 131 through 133>

Figure 10:
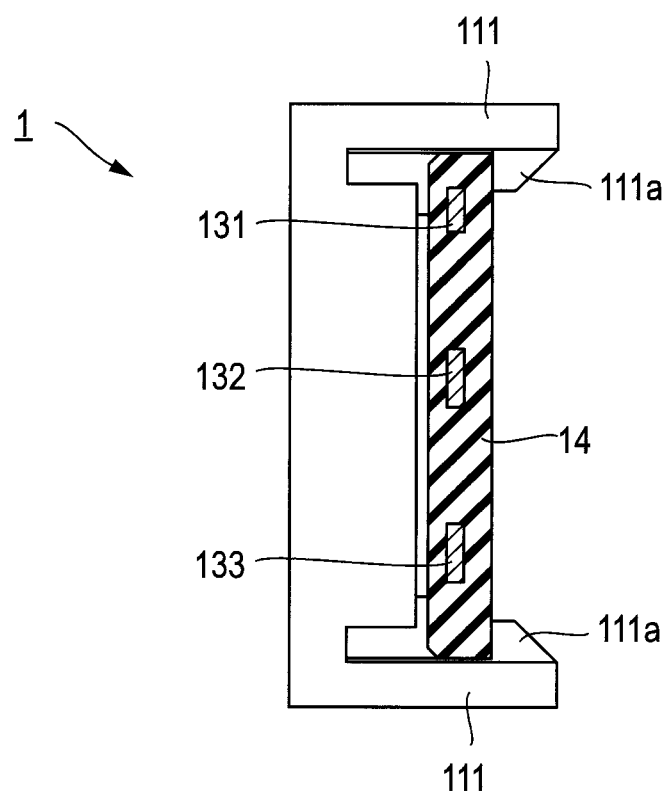
FIG. 10 is an X-X cross-sectional view of FIG. 1A.

The body 14 is made of resin and is in an approximately rectangular plate shape. The body 14 is formed with the three terminals 131 through 133 by insert molding (refer to FIG. 10).

The terminals 131 through 133 are provided respectively with fixed contact points 131a through 133a on one end sides and with connections 131b through 133b on the other ends (refer to FIG. 7). Further, the terminals 131 and 133 are provided respectively with joints 131d and 133d extendingly formed in a width direction, orthogonal to a sliding movement direction, from the fixed contact points 131a and 133a. In a surface, facing the slider 11 described later, of the body 14, a slightly concave recess is formed along the sliding movement direction, and the fixed contact points 131a through 133a are disposed in this recess, respectively, and exposed above.

On the fixed contact point disposition surface of the body 14, a first tubular frame 141 is formed. The first tubular frame 141 is in a rectangular tube shape and stands vertically to the fixed contact point disposition surface. In other words, the first tubular frame 141 has one end laid out on the fixed contact point disposition surface and the other end opened. Inside the first tubular frame 141, the fixed contact points 131a through 133a are laid out (refer to FIG. 11).

Figure 11:
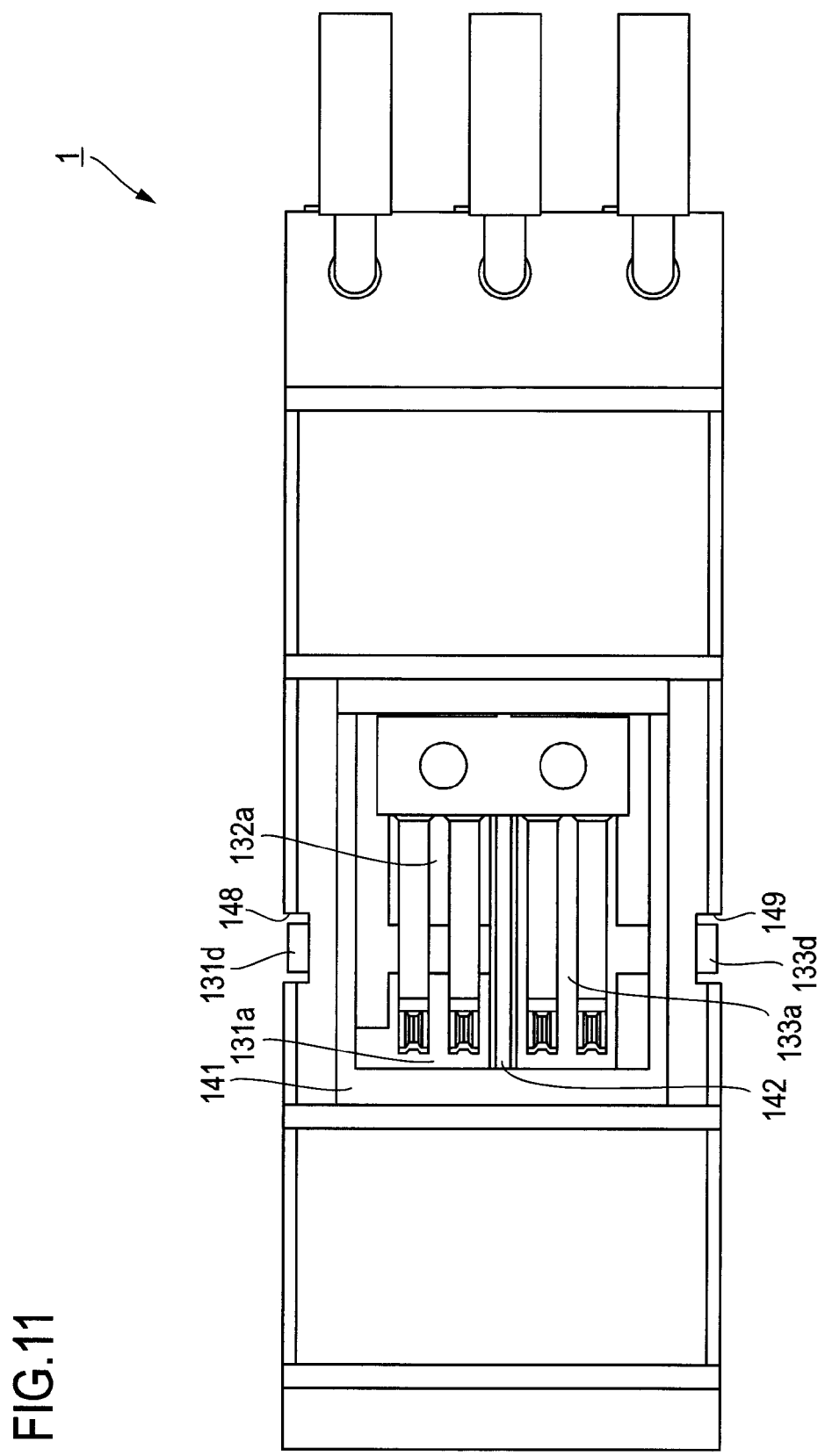
FIG. 11 is a front view of the slide switch according to the first embodiment looking through a slider.

The first fixed contact point 131a and the second fixed contact point 132a are located on one half side of the width direction orthogonal to the sliding movement direction, sequentially arranged in the sliding movement direction, and also disposed by being drawn (refer to FIGS. 7 and 11). In other words, the fixed contact points 131a and 132a are disposed respectively in a portion of a slide position of moving contact points 121c and 122c of the armature 12 attached to the slider 11. The armature 12 is described later. The third fixed contact point 133a is located on the other half side of the width direction orthogonal to the sliding movement direction and disposed by being drawn in the sliding movement direction. In other words, the fixed contact point 133a is disposed in the entire range of a slide position of moving contact points 123c and 124c of the armature 12 attached to the slider 11. In the sliding movement direction, a tip end position of the first fixed contact point 131a agrees with a tip end position of the third fixed contact point 133a.

Between the third fixed contact point 133a and the first and second fixed contact points 131a and 132a, a standing wall 142 is formed (refer to FIGS. 7 and 11). Although there is a possibility of occurring defects, such as a short circuit due to a foreign substance or migration, between the terminal 133 of a grounding line and the terminals 131 and 132 of a power supply line, it is possible to inhibit such a short circuit by being equipped with the standing wall 142.

Figure 13:
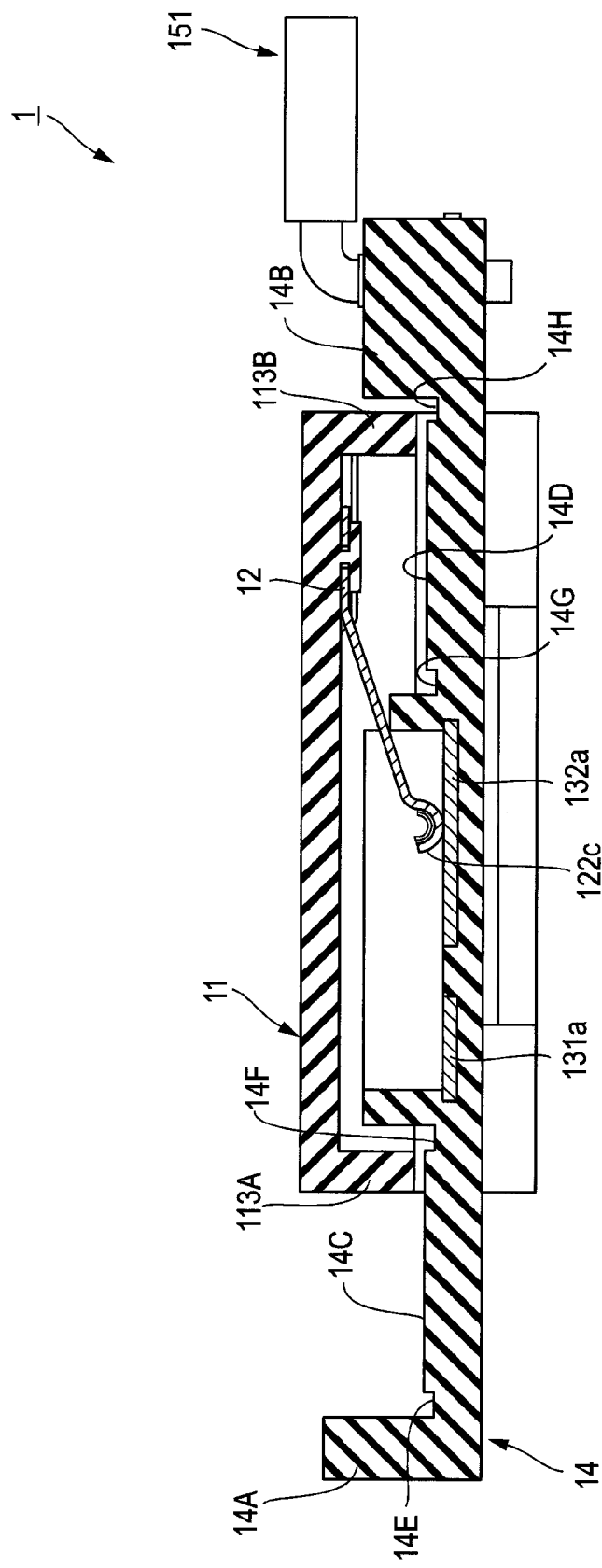
FIG. 13 is a XIII-XIII cross-sectional view of FIG. 1B.

Facing surfaces 14C and 14D are formed in the body 14. The facing surfaces 14C and 14D respectively face end surfaces of side walls 113A and 114B of the slider 11 in the entire range of the sliding movement of the slider 11 (refer to FIGS. 7, 13, and 14). The side walls 113A and 113B are described later. Foreign substance elimination grooves 14E and 14F are respectively formed at both end portions of the facing surface 14C in the sliding movement direction. Foreign substance elimination grooves 14G and 14H are respectively formed at both end portions of the facing surface 14D in the sliding movement direction. The foreign substance elimination grooves 14E and 14G respectively face the end surfaces of the side walls 113A and 113B in an initial position of the slider 11, and the foreign substance elimination grooves 14F and 14H respectively face the end surfaces of the side walls 113A and 113B in a post-action position of the slider 11.

A front surface (the fixed contact point disposition surface) of the body 14 has one end portion (right end) in the sliding movement direction with an engagement wall 14A and has the other end portion (left end) with an engagement wall 14B, protrudingly formed therein respectively. The engagement walls 14A and 14B respectively hit the side walls 113A and 113B of the slider 11 to restrict the sliding movement. A back surface (the surface opposite to the fixed contact point disposition surface) of the body 14 has one end portion (right end) in the sliding movement direction with three recesses 143 through 145 formed therein (refer to FIG. 9), and the connections 131b through 133b are respectively located in these recesses 143 through 145 (refer to FIGS. 8 and 9). A standing wall 146 is formed between the recesses 143 and 144, and a standing wall 147 is formed between the recesses 144 and 145. Although there is a possibility of occurring defects, such as a short circuit due to a foreign substance or migration, between the terminals 131 and 132 of the power supply line or between the terminal 132 of the power supply line and the terminal 133 of the grounding line, it is possible to inhibit such a short circuit by being equipped with the standing walls 146 and 147.

The body 14 has top and bottom surfaces with grooves 148 and 149 respectively formed in positions corresponding to the joints 131d and 133d. When insert molding, the terminals 131 and 133 are fixed respectively in the joints 131d and 133d to form the grooves 148 and 149 so as to expose the joints 131d and 133d (refer to FIGS. 9 and 11).

<Slider 11 and Armature 12>

The slider 11 is made of resin and is in an approximately rectangular plate shape. The slider 11 has an armature mounting surface on both ends in the width direction orthogonal to the sliding movement direction with a pair of engagement pieces 111 formed protrudingly thereon. The engagement pieces 111 have tip ends (free ends) with engaging claws 111a formed inward to each other (refer to FIGS. 9 and 10).

The armature 12 is made with a flat spring material, and in the present embodiment, is made with a fixed portion 12a and four leg portions 121b through 124b supported by the fixed portion 12a (refer to FIG. 9). The four leg portions 121b through 124b bent backward from the fixed portion 12a have tip ends (free ends) respectively formed with the moving contact points 121c through 124c bent so as to be shaped in an arc.

The armature 12 is attached to a surface, facing the body 14, of the slider 11. The attachment is carried out by inserting a pair of dowels 112 formed on the surface, facing the body 14, of the slider 11 through a pair of holes 12d formed in the fixed portion 12a of the armature 12 to heat caulk the tip ends.

The armature mounting surface of the slider 11 has both end portions in the sliding movement direction respectively formed with the side walls 113A and 113B. In the present embodiment, on the armature mounting surface of the slider 11, a second tubular frame 113 is formed. The second tubular frame 113 is in a rectangular tube shape and stands vertically to the armature mounting surface. That is, the side walls 113A and 113B are formed as a portion of the second tubular frame 113. In other words, the second tubular frame 113 has one end laid out on the armature mounting surface and the other end opened. Inside the second tubular frame 113, the armature 12 and the first tubular frame 141 are stored.

The slider 11 is provided with an engagement part to receive an action of the moving part 51 that moves in the sliding movement direction in association with extraction and insertion of an object. The engagement part is in a shape of generating a free running distance in which the slider does not act even when the moving part 51 acts. For example, in a case that the moving part 51 is in a cylindrical shape as the present embodiment, the slider 11 has an engagement hole 115 in a groove shape extending in the sliding movement direction on a surface to receive the action of the moving part 51 (refer to FIGS. 1A, 1B, and 6). The slider 11 is formed in such a manner that a length $L_1$ of the engagement hole 115 in the sliding movement direction becomes longer than a length $L_2$ of the column shape portion in the sliding movement direction. As the moving part 51 acts in the sliding movement direction, the moving part 51 is engaged with an end of the engagement hole 115 to slidingly move the slider 11. At this time, even when the moving part 51 acts, a difference between $L_1$ and $L_2$ ($L_1-L_2$) becomes in a range in which the slider 11 does not act, that is, a free running distance $d_3$. When an amount of the sliding movement of the slider 11 is $s_1$, a sliding movement amount $s_2$ of the moving part 51 becomes $s_1+d_3$ and $s_1<s_2$. Therefore, for the presence of the free running distance $d_3$, it is possible to shorten the action range of the slider 11, and it is possible to downsize the slide switch 1 to that extent.

Between the walls making up the second tubular frame 113 formed along the sliding movement direction and the pair of engagement pieces 111, grooves 114 are formed, respectively (refer to FIG. 9). Upon attaching the slider 11 to the body 14, the front surface of the body 14 is engaged with the engaging claws 111a and the engagement pieces 111 are elastically deformed outwardly, and as the engaging claws 111a reach the back surface of the body 14 (in other words, the surface opposite to the surface facing the slider 11), the engagement pieces 111 are restored.

Figure 14:
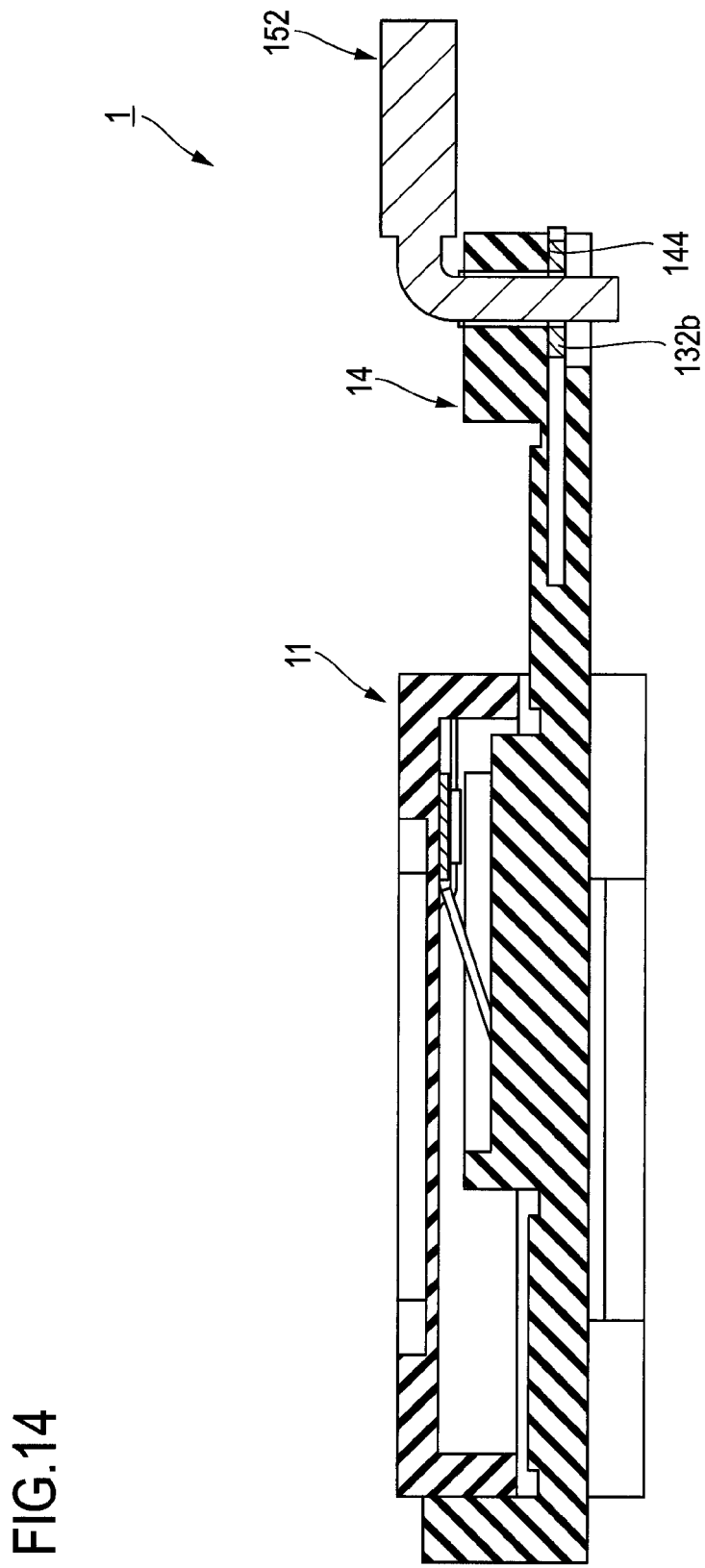
FIG. 14 is a XIV-XIV cross-sectional view of FIG. 1A.

The connections 131b through 133b of the terminals 131 through 133 and the recesses 143 through 145 of the body 14 have holes formed respectively therein, and tip ends of the harnesses 151 through 153 are inserted into the holes and are solder fixed (refer to FIGS. 9 and 14).

With such a configuration, the slider 11 is slidably held in the body 14 and is pushed by inserting the tongue to slidingly move. Further, in the entire range of sliding movement, the body 14 and the slider 11 cover all around the fixed contact points 131a through 133a and the armature 12. In addition, in the entire range of sliding movement, the slider 11 covers all around the joints 131d and 133d and the grooves 148 and 149. With such a configuration, a foreign substance is prevented from entering into the grooves 148 and 149 located inside the engagement pieces 111 of the slider 11, and further, a foreign substance is prevented from entering inside the first tubular frame 141 and the second tubular frame 113 from the grooves 148 and 149. That is, it is possible to reduce routes of entry of a foreign substance.

<Action of Slide Switch 1>

As the tongue is inserted into the buckle device, the moving part 51 equipped on the buckle device side is pushed and the moving part 51 moves by a free running distance from the initial position in a post-action position direction, and the moving part 51 is engaged with one end portion (right end) of the engagement hole 115 and the slider 11 is pushed by the moving part 51 to slidingly move to the post-action position. As the tongue is removed from the buckle device, the moving part 51 returns to the initial position in sliding movement by a mechanism on the buckle device side, and the slider 11 is pushed by the moving part 51 in association with that and returns to the initial position in sliding movement. In other words, the moving part 51 moves by a free running distance from the post-action position in the initial position direction by the mechanism on the buckle device side, and the moving part 51 is engaged with the other end portion (left end) of the engagement hole 115, and the slider 11 is pushed by the moving part 51 to slidingly move to the initial position. In association with the sliding movement of the slider 11, the moving contact points 121c and 122c slide on the fixed contact point 131a or 132a and the moving contact points 123c and 124c slide on the fixed contact point 133a. Descriptions are given in detail below.

The fixed contact points 131a through 133a are in a state of being disposed along the sliding movement direction of the slider 11 on a surface, near facing the slider 11, of the body 14, and the moving contact points 121c through 124c of the armature 12 slide on the fixed contact point disposition surface of this body 14 in association with the sliding movement of the slider 11. The third fixed contact point 133a is located over the slide positions of the third and the fourth moving contact points 123c and 124c in the entire length. The first and the second fixed contact points 131a and 132a are sequentially located in the slide positions of the first and the second moving contact points 121c and 122c.

In the initial position of the slider 11, the third and the fourth moving contact points 123c and 124c make contact with the third fixed contact point 133a, the first and the second moving contact points 121c and 122c make contact with the first fixed contact point 131a (refer to FIG. 12), and the switch between the fixed contact points 131a and 133a is turned on (closed). In contrast, in the post-action position of the slider 11, the third and the fourth moving contact points 123c and 124c make contact with the third fixed contact point 133a, the first and the second moving contact points 121c and 122c make contact with the second fixed contact point 132a (refer to FIG. 13), and the switch between the fixed contact points 132a and 133a is turned on (closed).

Figure 12:
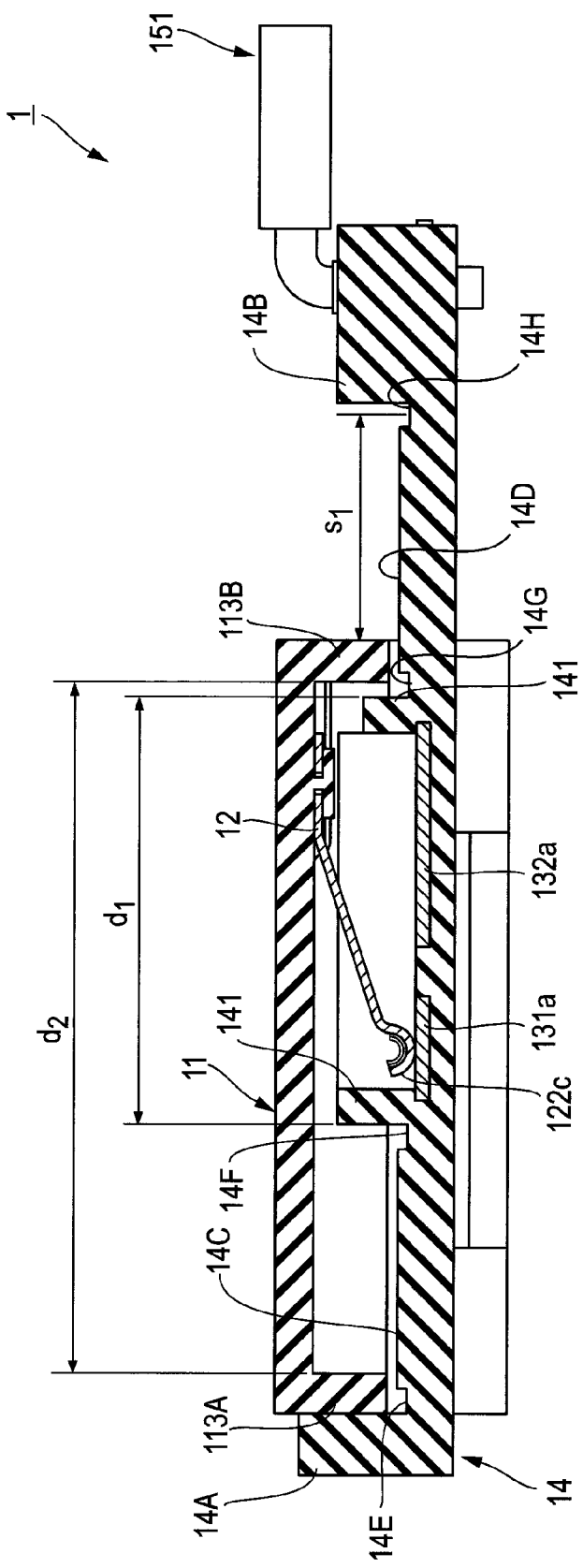
FIG. 12 is a XII-XII cross-sectional view of FIG. 1A.

The second tubular frame 113 is formed in such a manner that a distance $d_2$ of the inner periphery of the second tubular frame 113 in the sliding movement direction becomes not less than a sum of a distance $d_1$ of an outer periphery of the first tubular frame 141 in the sliding movement direction and an amount $s_1$ of sliding movement (refer to FIG. 12).

In association with such movement of the slider 11, a contact state of the moving contact points is switched, and this enables to detect a latched state (the inserted and engaged state) and an unlatched state (the extracted state) of the tongue to the buckle device.

<Effects>

The side walls 113A and 113B are formed so as to narrow the gap with the body 14, thereby enabling to reduce entrance of a foreign substance adhered to the facing surfaces 14C and 14D of the body 14. Further, the facing surfaces 14C and 14D are equipped with the foreign substance elimination grooves 14E through 14H, thereby enabling to reduce biting of a foreign substance adhered to the facing surfaces 14C and 14D. A foreign substance adhered to the facing surfaces 14C and 14D outside the second tubular frame 113 is swept into the foreign substance elimination grooves 14E and 14H by sliding movement of the side walls 113A and 113B. While there is a possibility that a foreign substance gets into the second tubular frame 113 of the slider 11, a foreign substance adhered to the facing surfaces 14C and 14D inside the second tubular frame 113 is swept into the foreign substance elimination grooves 14F and 14G by sliding movement of the side walls 113A and 113B. Therefore, it is possible to reduce entrance and biting of a foreign substance with such a configuration and improve the reliability.

In the present embodiment, the shape of generating a free running distance in which the slider 11 does not act even when the moving part 51 acts is given to the slider 11, so that it is possible to set the action range of the slider 11 of the slide switch 1 smaller regardless of the action range of the moving part 51 on the buckle device side of the seat belt. The action range of the slider 11 is set smaller, thereby enabling shortening the length of the slide switch 1 in the sliding movement direction and achieving downsizing.

In addition, the action range of the slider 11 of the slide switch 1 is set smaller, thereby enabling making exposure ranges of the moving contact points and the fixed contact points smaller or eliminated. In the present embodiment, the first tubular frame 141 of the body 14 and the second tubular frame 113 of the slider 11 cover all around the fixed contact points 131a through 133a and the armature 12 in the entire range of sliding movement, thereby eliminating the exposure ranges. That is, the fixed contact points 131a through 133a and the armature 12 are covered with the slider 11 and the body 14 so as not to be exposed outside directly for protection. Accordingly, compared with the conventional techniques, the armature 12 and the fixed contact points 131a through 133a are not easily affected by a foreign substance and the like and it is possible to prevent adhesion of a foreign substance, such as dust, and therefore, the performances are not impaired by adhesion of a foreign substance and the like, and thus it is possible to obtain a slide switch that is excellent in dust resistance and reliability.

In addition, while a foreign substance becomes even more easily adhered in a case of applying grease on the fixed contact points 131a through 133a in order to prevent corrosion of the fixed contact points 131a through 133a and also to improve slidability, such a problem is also solved by the present embodiment. Grease is not exposed similarly to the fixed contact points 131a through 133a, so that such problems do not occur that, for example, grease is transferred or adhered to an unintended area or component during a procedure, and therefore, it is possible to simplify the handling.

Further, while such measures are conventionally taken that, for example, quick drying grease is used in order to prevent adhesion of a foreign substance, such restrictions are eliminated in the present embodiment, so that there is also an advantage, such as enlarging a range of selecting grease.

<Other Modifications>

Figure 15:
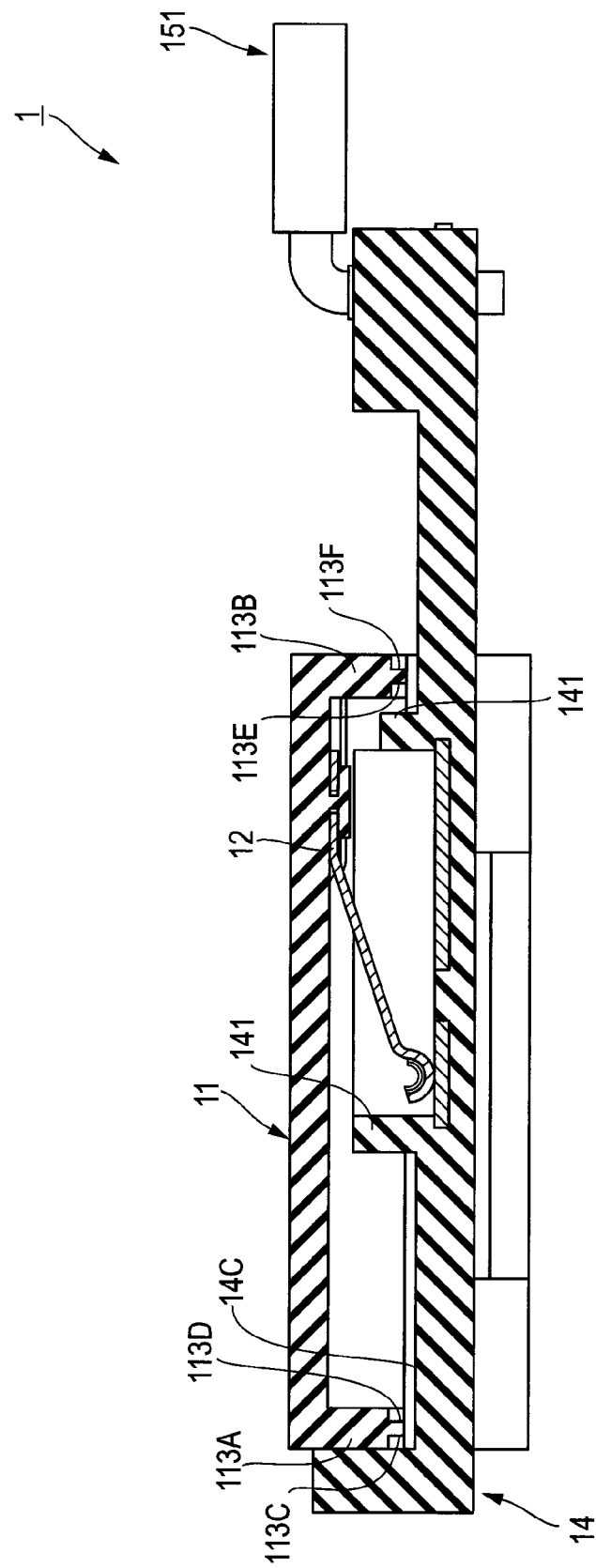
FIG. 15 is a cross-sectional view of a modification of a slide switch according to the first embodiment.
Figure 16:
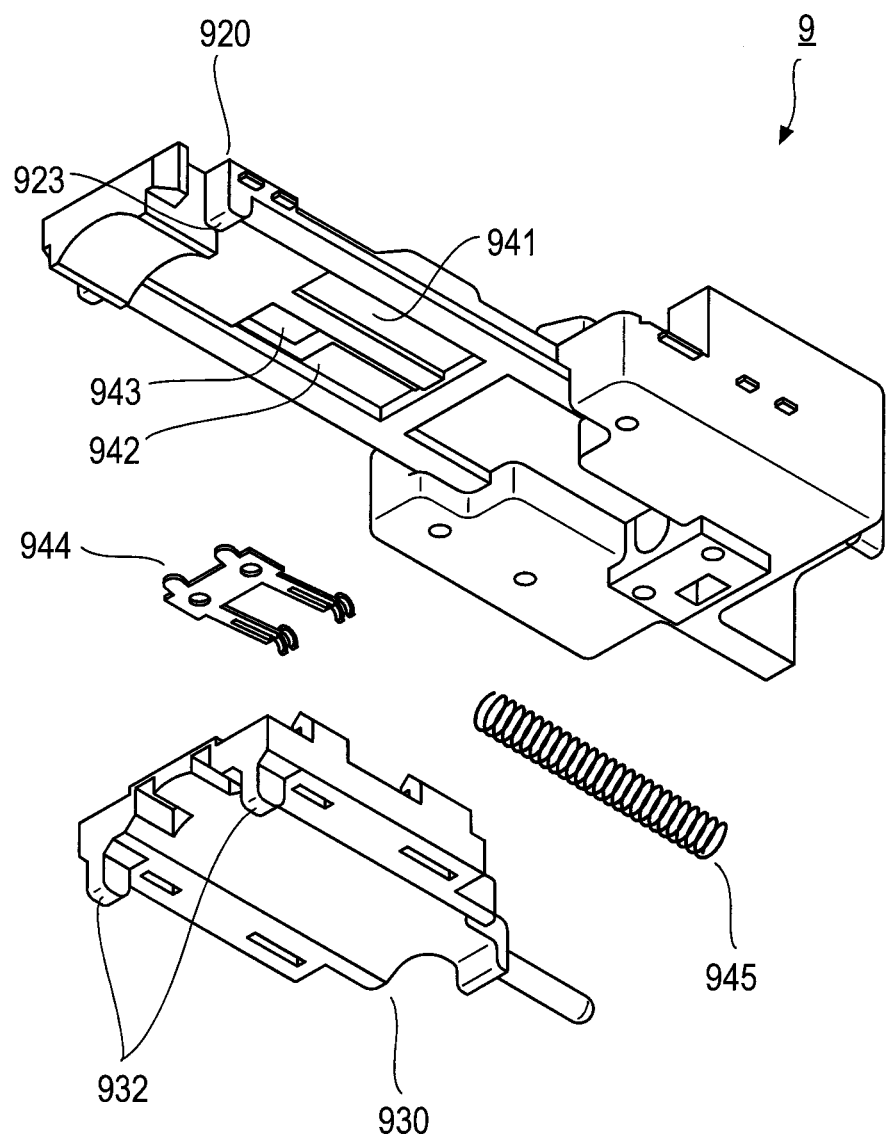
FIG. 16 is an exploded perspective view illustrating a configuration of a conventional slide switch.
Figure 17A:
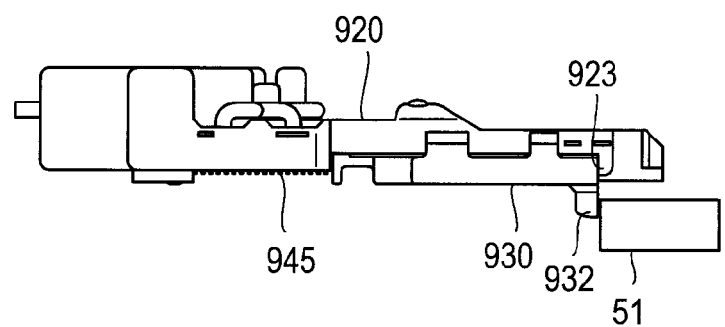
FIG. 17A is a front view of a slide switch in a conventional technique in a case that a slider is located in an initial position.
Figure 17B:
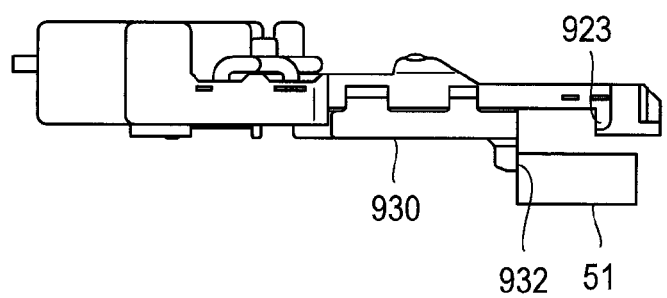
FIG. 17B is a front view of a slide switch in the conventional technique in a case that the slider is located in a post-action position.

The foreign substance elimination grooves may also be formed, not in the end in the sliding movement direction of the facing surfaces 14C and 14D of the body 14, but in the end in the sliding movement direction of end surfaces of the side walls 113A and 113B of the slider 11 (refer to foreign substance elimination grooves 113C through 113F in FIG. 15). With such a configuration, it is possible to obtain effects similar to those in the first embodiment. Further, foreign substance elimination grooves may also be formed in both ends in the sliding movement direction of the facing surfaces 14C and 14D of the body 14 and ends in the sliding movement direction of end surfaces of the side walls 113A and 113B of the slider 11. With such a configuration, it is possible to reduce biting of a larger foreign substance.

The number of foreign substance elimination grooves may be set appropriately. For example, in a case that it is understood in advance that a foreign substance adheres only to the facing surface 14C of the body 14 and does not adhere to the facing surface 14D, only the foreign substance elimination grooves 14E and 14F may be equipped. In addition, in a case that the side walls 113A and 113B are formed so as to narrow the gap with the body 14 as much as possible and it is possible to almost fully prevent a foreign substance from entering into the second tubular frame 113, it is not required to sweep out a foreign substance adhered to inside the second tubular frame 113, so that only the foreign substance elimination grooves 14E and 14H may be equipped.

The width, the depth, and the length of the foreign substance elimination grooves may be set appropriately in accordance with a target foreign substance. The foreign substance elimination grooves are formed over the entire range of the facing surfaces 14C and 14D of the body 14 in the width direction orthogonal to the sliding movement direction as in the present embodiment, thereby enabling to let a foreign substance out in both upward and downward directions.

The slide switch is not limited to those incorporated into a buckle device, but can also be utilized for overall slide switches that sense an extracted state and an inserted and engaged state of an object. In particular, application to a slide switch having facing surfaces, against the slider, of the body exposed to outside is effective.

The moving part only needs to slidingly move in conjunction with sliding movement of an object. Therefore, the moving part may also be, not only those equipped on the side of a device having the slide switch incorporated thereto, those equipped on the side of an object and also be an object itself.

Figure 18:
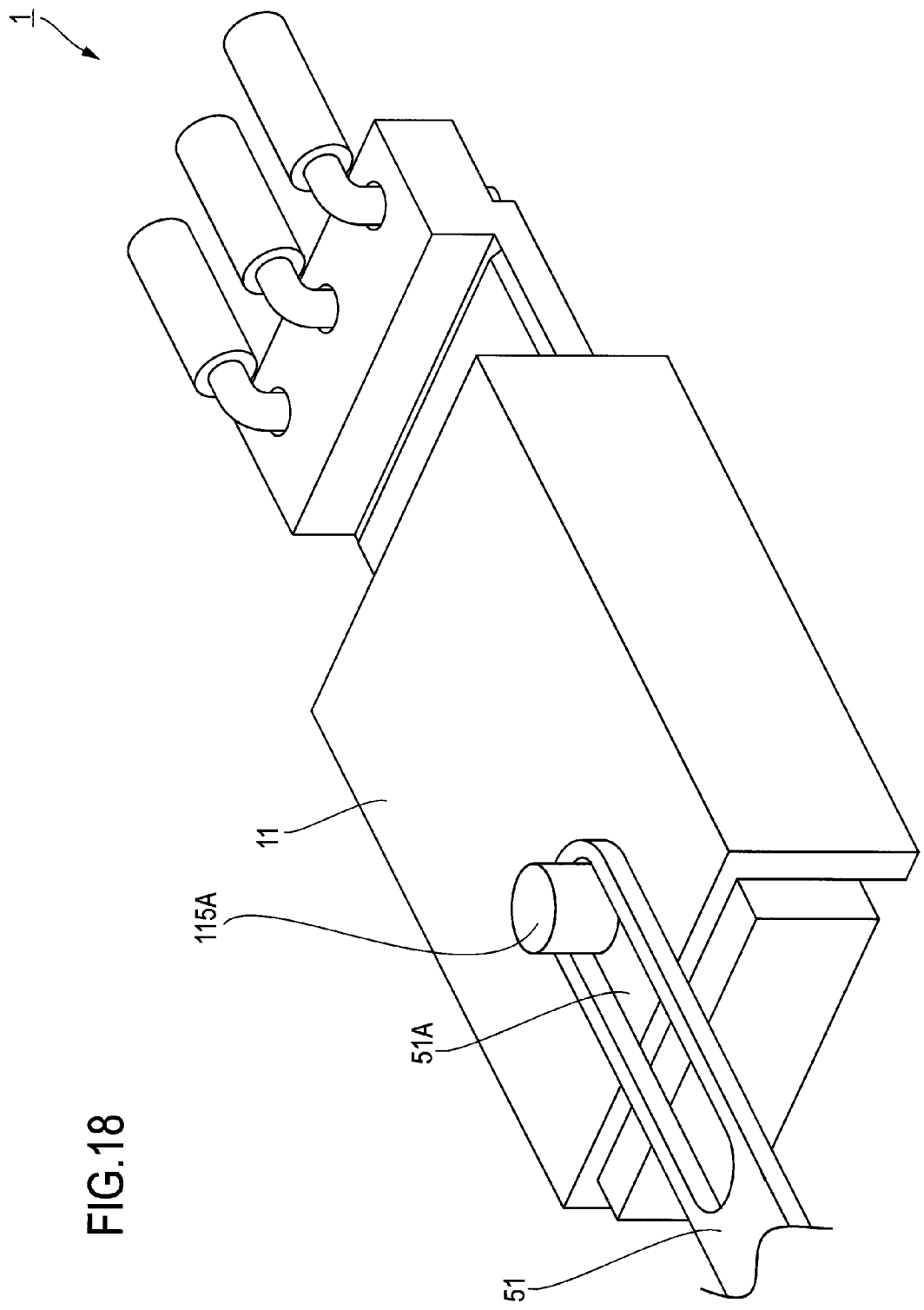
FIG. 18 is a perspective view of a slide switch according to a modification viewed from the front.

The shape of the engagement part of the slider is not limited to the shape in the first embodiment and may be a shape of receiving the action of the moving part and generating a free running distance. For example, the engagement part may have a configuration in which the moving part 51 is provided with an engagement hole 51A in a groove shape extending in the sliding movement direction and the slider 11 is provided with a projection 115A in a cylindrical shape (refer to FIG. 18). At this time, it is possible to obtain effects similar to those in the present embodiment by forming the slider 11 in such a manner that the length of the projection 115A in a cylindrical shape of the slider 11 in the sliding movement direction becomes shorter than the length of the engagement hole 51A of the moving part 51 in the sliding movement direction. In FIG. 18, the engagement hole 51A is penetrating, while it may also have a bottom.

While the engagement part of the slider is formed in the front surface in the present embodiment, it may also be formed on a top or bottom surface or the like as long as it is a surface to receive the action of the moving part.

While the grooves 114 are formed respectively between the walls of the second tubular frame 113 formed along the sliding movement direction and the pair of engagement pieces 111 in the present embodiment, the pair of engagement pieces 111 may also be used as the walls of the second tubular frame 113 without being equipped with the grooves 114. In this case, while a length in the width direction orthogonal to the sliding movement direction can be shortened, a configuration as follows is required because the elastically deformed area in the engagement pieces 111 is shortened.

(1) In order to reduce the amount of elastic deformation of the engagement pieces 111, the size of the engaging claws 111a is made smaller. It should be noted that, in this case, there is a disadvantage of increasing the possibility that the engagement pieces 111 depart from the body 14 due to impact or the like.

(2) In order to be elastically deformed, the length of the engagement pieces 111 is required to be elongated. It should be noted that, in this case, there is a disadvantage of increasing the thickness of the slide switch 1.

(3) In the second tubular frame 113 of the slider 11, grooves are equipped. The grooves are formed between a wall equipped in an end in the sliding movement direction and a wall equipped in an end in the direction orthogonal to the sliding movement direction. While the first tubular frame 141 of the body 14 and the second tubular frame 113 of the slider 11 can cover all around the fixed contact points 131a through 133a and the armature 12 in the entire range of sliding movement even in this case, there is a disadvantage of increasing the possibility that a foreign substance enters from the grooves of the second tubular frame 113 of the slider 11.

(4) In order to facilitate elastic deformation of the engagement pieces 111, the thickness of the engagement pieces 111 is thinned. It should be noted that there is a disadvantage of not being able to obtain required strength when the engagement pieces 111 are thinned excessively.

While an electrical signal is taken out by soldering the three harnesses 151 through 153 to obtain an ON signal in the initial position and an ON signal in the post-action position, respectively, in the present embodiment, a detection method (usage) by soldering the two harnesses 152 and 153 to obtain an ON signal in the post-action position (a latched state of the tongue) may also be used. In this case, the terminal 131 may not be equipped.

While the present embodiment has a configuration that the mechanism to return the slider 11 in a case of removing the tongue from the buckle device exists on the buckle device side, it may also have a configuration that, for example, a spring, not shown, is interposed between the body 14 and the slider 11 to automatically return the slider 11 to the initial position by an elastic restoring force of the spring.

While the armature 12 is attached to the slider 11 by heat caulking in the present embodiment, those made with the armature 12 insert molded to the slider 11 may also be used. In addition, the armature 12 may also be fixed to the slider 11, not by heat caulking or insert molding, but by another method.

The present invention is not limited to the embodiments and modifications above but can be modified appropriately without departing from the spirit of the present invention.

What is claimed is:

1. A slide switch, sensing an extracted state and an inserted and engaged state of an object, comprising:
   a body;
   a slider slidably held in the body and pushed by insertion of the object to slidingly move;
   a terminal provided with a fixed contact point disposed on a surface, facing the slider, of the body along a sliding movement direction; and
   an armature attached to the slider and provided with a moving contact point sliding on a fixed contact point disposition surface of the body in association with sliding movement of the slider; wherein
   the slider has an armature mounting surface in one end in the sliding movement direction with a first side wall protrudingly formed therein,
   the body has a first facing surface facing an end surface of the first side wall formed in an entire range of sliding movement, and
   at least any one of an end in the sliding movement direction of the end surface of the first side wall and an end in the sliding movement direction of the first facing surface of the body has a first foreign substance elimination groove formed therein.

2. The slide switch according to claim 1, wherein
   a position of the slider in the extracted state of the object is an initial position and a position of the slider in an inserted and engaged state of the object is a post-action position,
   the slider has the armature mounting surface in the other end in the sliding movement direction with a second side wall protrudingly formed therein,
   the body has a second facing surface facing an end surface of the second side wall formed in an entire range of sliding movement,
   the first foreign substance elimination groove is formed on the first facing surface facing the end surface of the first side wall in the initial position,
   a second foreign substance elimination groove is formed on the first facing surface facing the end surface of the first side wall in the post-action position, and
   a third foreign substance elimination groove and a fourth foreign substance elimination groove are respectively formed on the second facing surface facing the end surface of the second side wall in the initial position and the post-action position.

3. The slide switch according to claim 1 or 2, wherein
the slider is provided with an engagement part to receive an action of a moving part moving in the sliding movement direction in association with extraction and insertion of the object, and the engagement part is in a shape of generating a free running distance in which the slider does not act even when the moving part acts.

4. The slide switch according to any one of claims 1 or 2, wherein
the body and the slider cover all around the fixed contact point and the armature in an entire range of the sliding movement.

5. The slide switch according to any one of claims 1 or 2, wherein
the fixed contact point disposition surface of the body has a first tubular frame standing vertically to the fixed contact point disposition surface and laid out with the fixed contact point inside formed thereon, and the armature mounting surface of the slider has a second tubular frame standing vertically to the armature mounting surface and storing the armature and the first tubular frame inside formed thereon, and
the side walls of the slider are a portion of the second tubular frame.

6. The slide switch according to claim 3, wherein
the body and the slider cover all around the fixed contact point and the armature in an entire range of the sliding movement.

7. The slide switch according to claim 3, wherein
the fixed contact point disposition surface of the body has a first tubular frame standing vertically to the fixed contact point disposition surface and laid out with the fixed contact point inside formed thereon, and the armature mounting surface of the slider has a second tubular frame standing vertically to the armature mounting surface and storing the armature and the first tubular frame inside formed thereon, and
the side walls of the slider are a portion of the second tubular frame.

\* \* \* \* \*